US007688224B2

(12) United States Patent
Teffer et al.

(10) Patent No.: US 7,688,224 B2
(45) Date of Patent: Mar. 30, 2010

(54) METHOD AND SYSTEM FOR COLLECTING TRAFFIC DATA, MONITORING TRAFFIC, AND AUTOMATED ENFORCEMENT AT A CENTRALIZED STATION

(75) Inventors: Dean Teffer, Austin, TX (US); Alexander Sherwood, Austin, TX (US)

(73) Assignee: Siemens Industry, Inc., Alpharetta ( * ) Notice: Subject to any disclaimer, the term of this patent is extended or adjusted under 35 U.S.C. 154(b) by 494 days.

(21) Appl. No.: 10/963,988

(22) Filed: Oct. 12, 2004

(65) Prior Publication Data

US 2005/0122235 A1 Jun. 9, 2005

Related U.S. Application Data

(60) Provisional application No. 60/510,780, filed on Oct. 14, 2003.

(51) Int. Cl.
*G08G 1/08* (2006.01)
*G08G 1/00* (2006.01)
*G06F 19/00* (2006.01)
*G06G 7/70* (2006.01)
*G06G 7/76* (2006.01)

(52) U.S. Cl. ...................................... 340/910; 701/117

(58) Field of Classification Search ...... 340/907–932.1; 345/2.1, 2.2, 2.3; 116/63 R, 213; 701/117
See application file for complete search history.

(56) References Cited

U.S. PATENT DOCUMENTS 3,784,971 A * 1/1974 May ........................... 340/924
5,777,564 A * 7/1998 Jones ......................... 340/917
5,948,038 A 9/1999 Daly et al. .................. 701/117
6,133,854 A * 10/2000 Yee et al. .................... 340/907
6,154,133 A * 11/2000 Ross et al. .................. 340/541
6,188,329 B1 * 2/2001 Glier et al. ............... 707/104.1
6,281,808 B1 8/2001 Glier et al. .................. 340/933
6,466,260 B1 10/2002 Hatae et al. ................ 348/149
6,546,119 B2 4/2003 Ciolli et al. ................. 382/104
6,710,722 B2 * 3/2004 Lee ............................ 340/910
6,950,789 B2 * 9/2005 Laird et al. .................... 703/8
2003/0189499 A1 * 10/2003 Stricklin et al. ............. 340/933

* cited by examiner

*Primary Examiner*—Jennifer Mehmood
(74) *Attorney, Agent, or Firm*—Michael J. Wallace

(57) ABSTRACT

A distributed individual vehicle information capture method for capturing individual vehicle data at traffic intersections and transmitting the data to a central station for storage and processing is provided. The method includes capturing individual vehicle information at a plurality of intersections (122) and transmitting the individual vehicle information from the intersections to a central station (124). Consequently, the individual vehicle information is available to be stored and processed by a device at the central station (126). Traffic intersection equipment for capturing individual vehicle data at traffic intersections and transmitting the data to a central station for storage and processing is also disclosed. The equipment includes a traffic detection device (159) for capturing individual vehicle data at an intersection (158) and a network connection to a central station (174). The traffic detection device (159) is operably configured to transmit to the central station (174) the individual vehicle information.

21 Claims, 17 Drawing Sheets

METHOD AND SYSTEM FOR COLLECTING TRAFFIC DATA, MONITORING TRAFFIC, AND AUTOMATED ENFORCEMENT AT A CENTRALIZED STATION

CROSS-REFERENCE TO RELATED PATENT APPLICATIONS

This patent application claims the benefit of U.S. Provisional Patent Application No. 60/510,780, entitled, "Method for collecting traffic data, monitoring traffic, and automated enforcement at a centralized station," and filed Oct. 14, 2003.

TECHNICAL FIELD OF THE DISCLOSURE

This disclosure pertains to monitoring and controlling roadway traffic. More particularly, this disclosure pertains to the collection, processing, and storage of traffic information.

BACKGROUND OF THE DISCLOSURE

Roadway traffic authorities recognize traffic information as highly important. Such information can facilitate traffic monitoring, safety research, and law enforcement, among other necessary and worthwhile governmental activities. In attempting to exploit the potential value of traffic information, the authorities have endeavored to capture, process, store, and utilize such information in a variety of ways.

It is now common for intersections to be equipped with traffic detection devices capable of detecting a vehicle's approach to an intersection. Such information can be processed, for example, to initiate a traffic signal sequence that will change the signal's state from red to green.

A law-enforcement application of the above processes has been to activate an image capture device at the intersection to record one or more images of a vehicle in the commission of a traffic violation. Authorities are especially interested in exploring ways to address speeding and red light violations using current and future technology.

Frequently, some or all traffic information is stored for some period of time and subsequently aggregated by one or more devices present at a traffic intersection. Once aggregated, such information is occasionally transmitted to a central station for storage and further processing. However, it has not been the practice to transmit individual vehicle information to the central station, resulting in a substantial loss of information which otherwise could have been stored and used in future projects (e.g., ongoing traffic management, update of existing traffic models, or real time analysis, etc.) and for other purposes.

Moreover, to the extent that a substantial portion of information processing occurs at individual traffic intersections, overall equipment needs are higher which drive greater overall costs.

Accordingly, there is a need for a method and system which enables continued capturing of distributed individual vehicle information, while also facilitating centralized processing and storage of the individual vehicle information.

BRIEF DESCRIPTION OF THE DRAWINGS

For a more complete understanding of the present disclosure, and the advantages thereof, reference is now made to the following brief descriptions taken in conjunction with the accompanying drawings, in which like reference numerals indicate like features.

DETAILED DESCRIPTION

Figure 1:
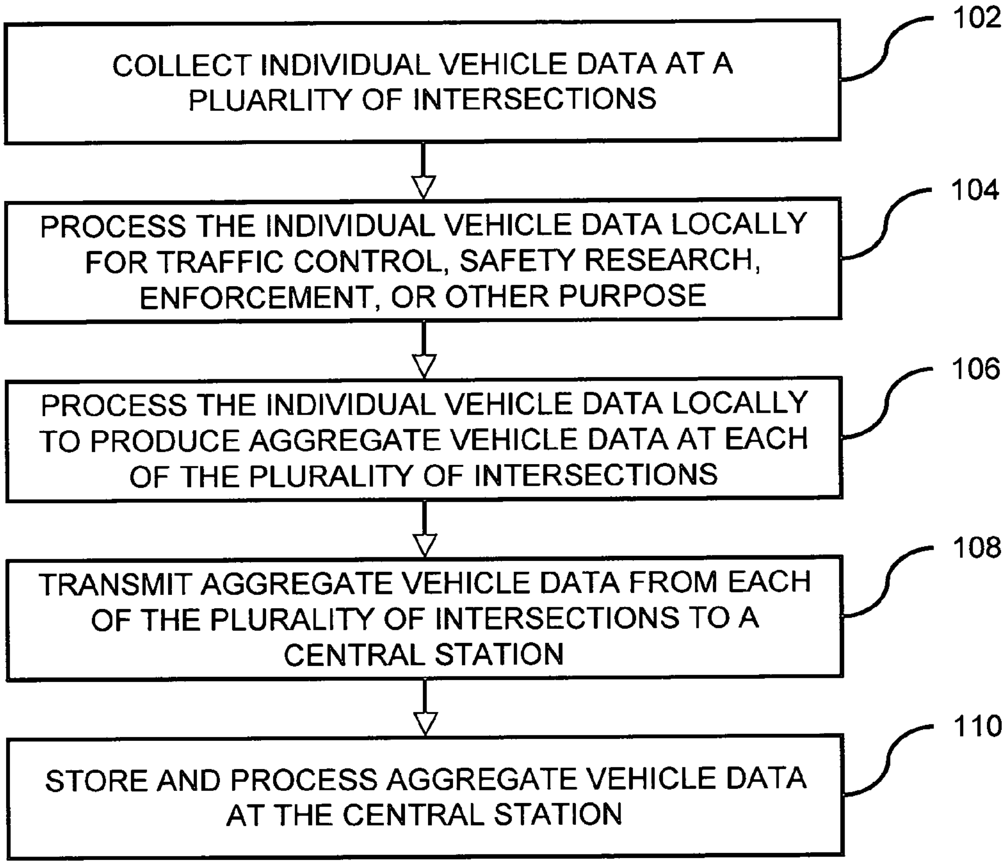
FIG. 1 (PRIOR ART)
FIG. 1 depicts a prior art method for centrally storing traffic data.

This disclosure provides a method and system for capturing individual vehicle information at multiple traffic intersections and transmitting the individual information to a central station for storage and further processing. As a result, individual vehicle data can be centrally processed, stored, and used in future projects (e.g., ongoing traffic management, update of existing traffic models, or real time analysis, etc.) and for other purposes.

A distributed individual vehicle information capture method for capturing individual vehicle data at traffic intersections and transmitting the data to a central station for storage and processing is described. The method includes capturing individual vehicle information at a plurality of intersections and transmitting the individual vehicle information from the intersections to a central station. Consequently, the individual vehicle information is available to be stored and processed by a device at the central station. The captured information can include individual raw vehicle data, and such individual raw vehicle data can be transmitted to the central station.

Some such methods include generating, at at least one of the plurality of intersections, individual vehicle contact closure data based on the individual vehicle information by the vehicle detection processor and transmitting the individual vehicle contact closure data from the at least one of the plurality of intersections to the central station. Other alternate implementations include transmitting the individual vehicle contact closure data, along with additional information, from the at least one of the plurality of intersections to the central station. The additional information can be individual vehicle speed, individual vehicle classification, individual vehicle violation detection, or individual vehicle time-stamped position, among others.

Yet other variations include transmitting traffic signal information from the intersections to the central station, and receiving from the central station, by equipment at at least one of the intersections, a control signal based on the individual vehicle information. Still further variations include (a) receiving from the central station, by an image capture device at at least one of the intersections, the control signal based on the individual vehicle information, causing the image capture device to capture at least one traffic image and (b) responsively to receiving the control signal, transferring the one or more traffic images from the image capture device to the central station.

The methods described can alternately be implemented through logic stored on a memory as a computer programming product.

Traffic intersection equipment for capturing individual vehicle data at traffic intersections and transmitting the data to a central station for storage and processing is also described. The equipment includes a traffic detection device for capturing individual vehicle data at an intersection and a network connection to a central station. The traffic device is operably configured to transmit to the central station the individual vehicle information. Alternately, the traffic device is configured to transmit to a vehicle detector at the central station the individual vehicle information.

Other embodiments include a vehicle detection processor, wherein the traffic detection device is configured to capture individual vehicle data comprising individual raw vehicle information. The vehicle detection processor is configured, as well, to generate individual vehicle contact closure information based on the individual raw vehicle information. The traffic device is operably configured to transmit to the central station individual vehicle information comprising individual vehicle contact closure information.

Still other alternate embodiments include an intelligent sensor, wherein the intelligent sensor is configured to generate individual intelligent vehicle information based on individual raw vehicle information captured by the traffic detection device. The individual intelligent vehicle information can be individual vehicle speed, individual vehicle classification, individual vehicle violation detection, and individual vehicle time-stamped position, among others, and the traffic device is operably configured to transmit to the central station individual vehicle information comprising individual vehicle intelligent information.

Yet other embodiments include enforcement equipment configured to operate responsively to a signal received from the central station in response to earlier transmitted individual vehicle information. The enforcement equipment comprises an enforcement camera for recording at least one image, and the enforcement camera is operably configured to transmit the at least one image to the central station.

Other aspects, objectives and advantages of the invention will become more apparent from the remainder of the detailed description when taken in conjunction with the accompanying drawings.

FIG. 1 depicts a prior art method for centrally storing traffic data. Individual vehicle data is collected at a plurality of intersections 102. The individual vehicle data is processed locally for traffic control, safety research, enforcement, or other purpose 104. The individual vehicle data is processed locally to produce aggregate vehicle data at each of the plurality of intersections 106. The aggregate vehicle data is transmitted from each of the plurality of intersections to a central station 108. The aggregate vehicle data is then stored and processed at the central station 110.

Figure 2:
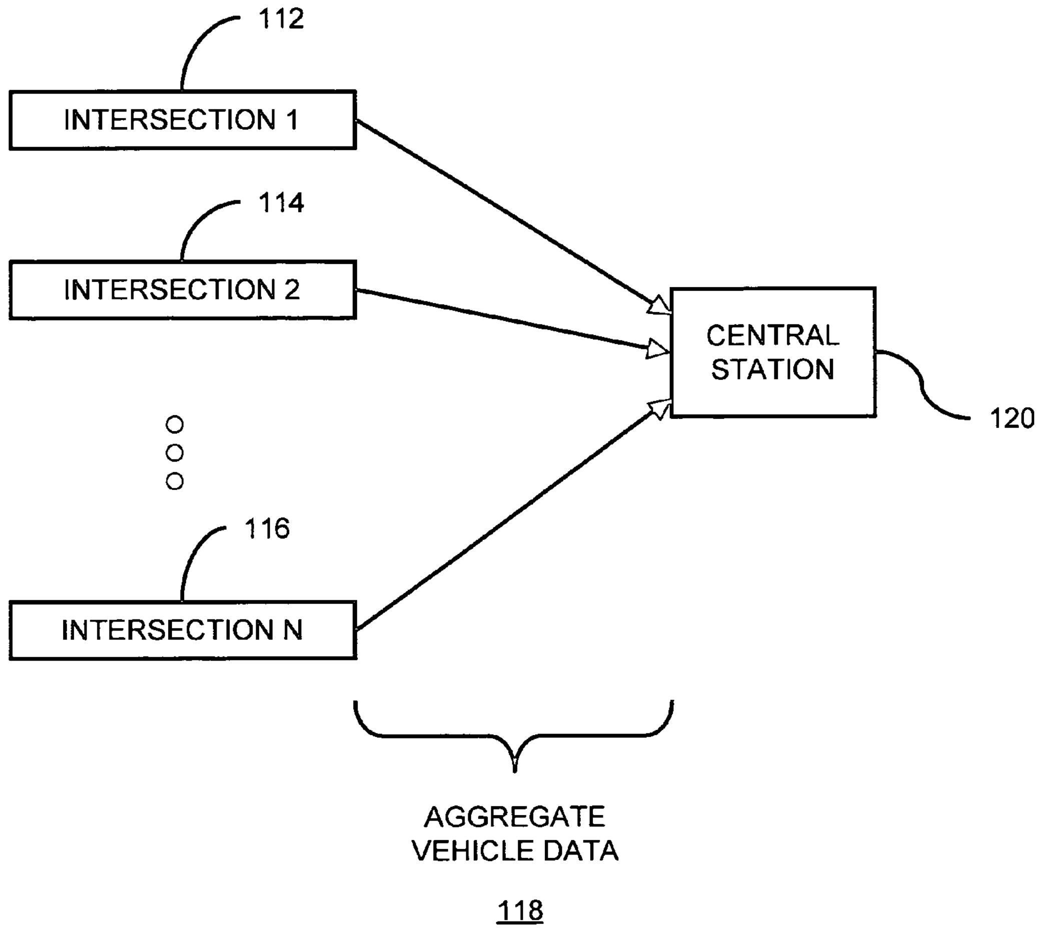
FIG. 2 (PRIOR ART)
FIG. 2 shows a high-level block diagram illustrating a prior art system for implementing the prior art method shown in FIG. 1.

FIG. 2 shows a high-level block diagram illustrating a prior art system for implementing the prior art method shown in FIG. 1. A plurality of intersections 112, 114, 116, transmit aggregate vehicle data 118 to a central station 120.

Figure 3:
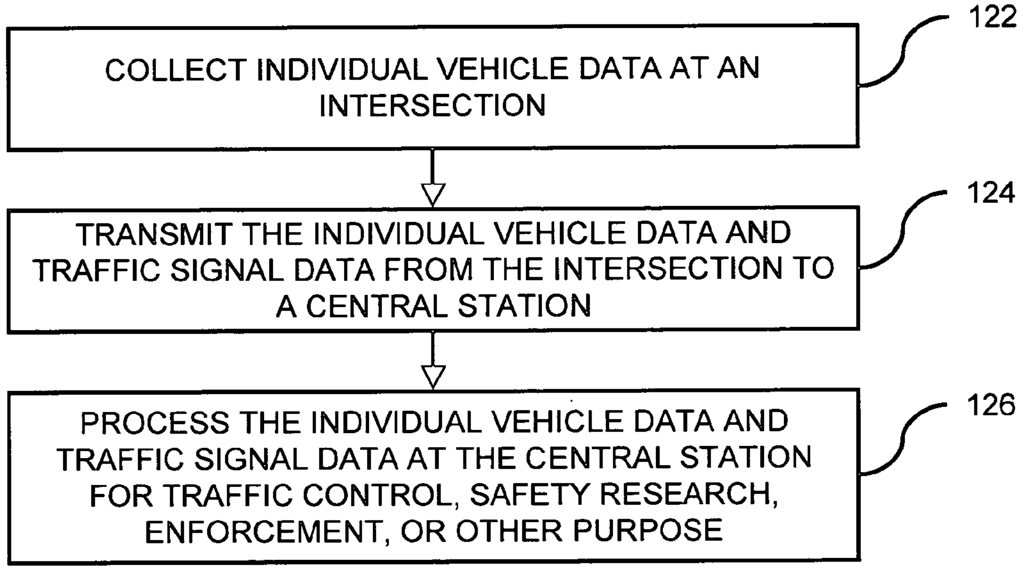
FIG. 3 depicts a method, according to an embodiment of the present disclosure.

FIG. 3 depicts a method, according to an embodiment of the present disclosure. Individual vehicle data and traffic signal data is collected at an intersection 122. Individual vehicle data and traffic signal data is transmitted from the intersection to a central station 124. The individual vehicle data and traffic signal data is processed at the central station for traffic control, safety research, enforcement, or some other purpose.

Figure 4:
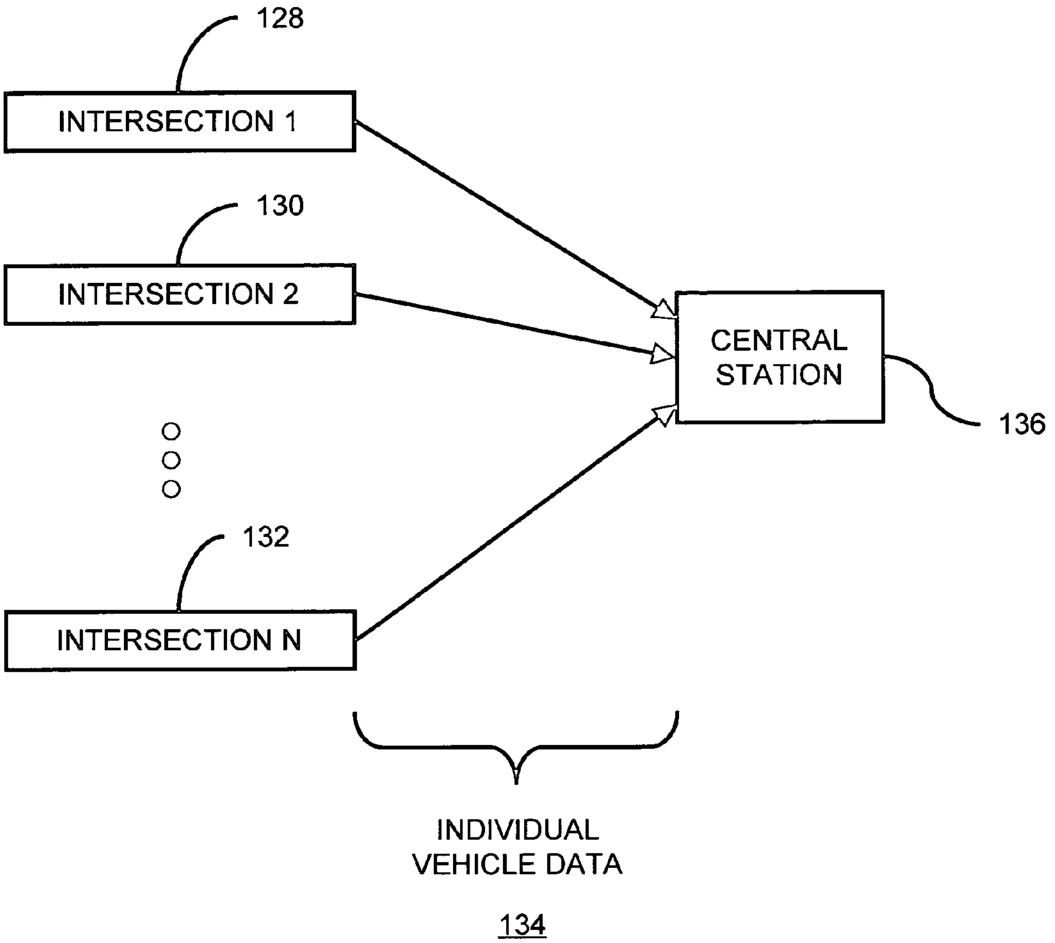
FIG. 4 shows a high-level block diagram illustrating a system for implementing the method shown in FIG. 3, according to an embodiment of the present disclosure.

FIG. 4 shows a high-level block diagram illustrating a system for implementing the method shown in FIG. 3. A plurality of intersections 128, 130, and 132, transmit individual vehicle data 134 to a central station 136.

Figure 5:
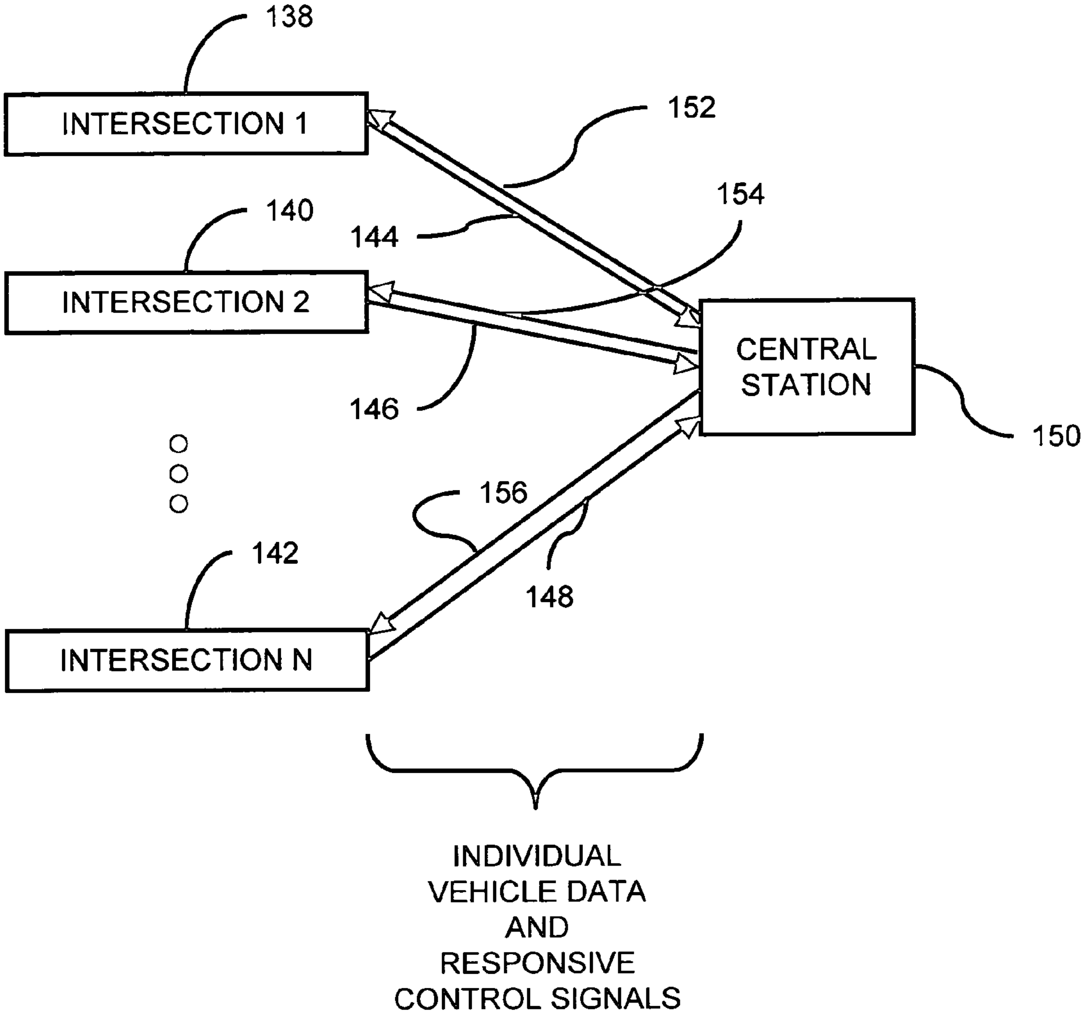
FIG. 5 shows a high-level block diagram illustrating a system for implementing the method shown in FIG. 3 alternately, according to an embodiment of the present disclosure.

FIG. 5 shows a high-level block diagram illustrating a system for implementing the method shown in FIG. 3 alternately. A plurality of intersections 138, 140, and 142, transmit individual vehicle data 144, 146, and 148 to a central station 150. In response, the central station sends to one or more of the intersections 138, 140, and 142 at least one control signal 152, 154, and 156.

Figure 6:
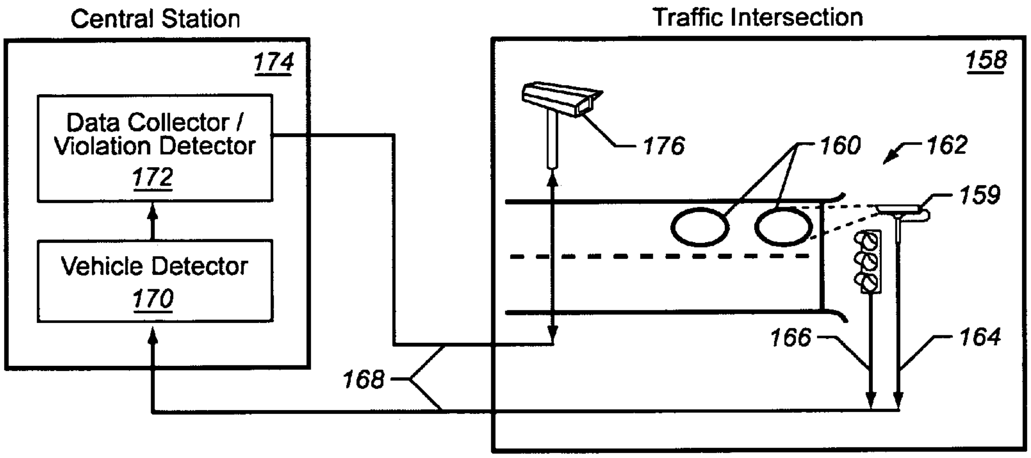
FIG. 6 illustrates an embodiment of the present disclosure for collecting individual vehicle data and traffic signal data and transmitting the data to a central monitoring station for processing.

FIG. 6 illustrates an embodiment for collecting individual vehicle data and traffic signal data and transmitting the data to a central monitoring station for processing. At a typical roadway intersection 158, a traffic detection device 159 monitors 160 an approach 162. In this case, raw sensor information 164, along with traffic signal state 166, is sent via network connection 168 first to vehicle detectors 170 and then to a data collection device 172 at a central monitoring station 174. In this example, the data collection device 172 may or may not be connected to an enforcement camera 176.

Multiple vehicle sensors 159 may establish detection zones 160 for vehicles approaching the intersection. Each lane of traffic to be monitored may include two or more detection zones 160. Detection zones 160 may be established by a variety of sensors 159 including but not limited to video cameras, inductive loops, microloops, video, pneumatic sensors, radar, laser, or microwave devices. Vehicle detection data 164 is delivered from the sensors 159 establishing the detection zone 160 and fed into vehicle detection processors that may be located locally or remotely (shown located locally in FIG. 6). Detection events 164 along with traffic signal light state 166 are transmitted via network connections 168 to a central monitoring station 174. If necessary, detection events 164 are fed into vehicle detectors 170; otherwise, detection events 164 are fed into data collection and/or violation detection computers 172 for actions such as storage, analysis, and interpretation. The data collection computer 172 then schedules the enforcement equipment 176 located at the remote traffic intersection 158 to trigger via network connection 168.

Figure 7:
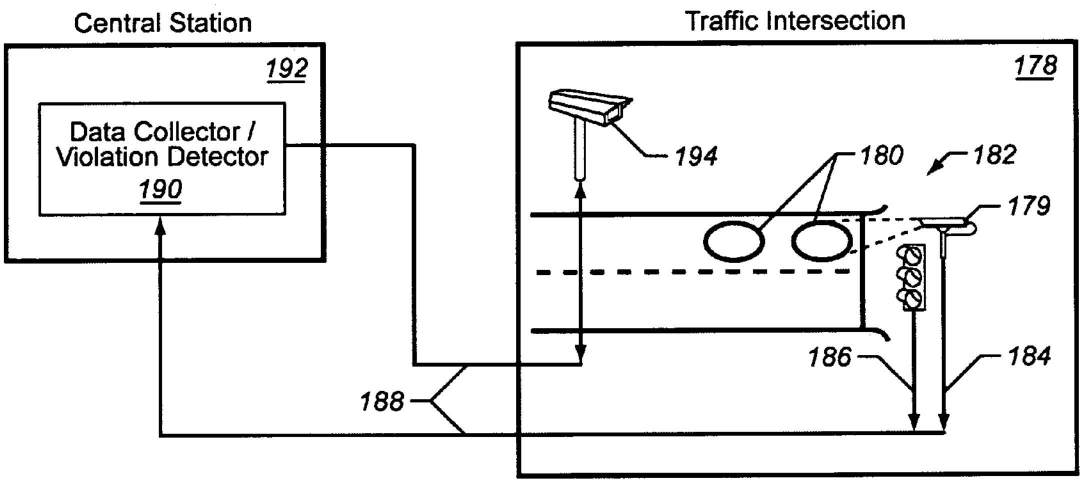
FIG. 7 depicts an alternate embodiment of the present disclosure similar to that depicted in FIG. 6, but wherein the individual vehicle data transmitted from the intersection to the central station has been processed, but not aggregated, but a vehicle detector.

FIG. 7 depicts another embodiment taught by the present disclosure, showing a typical roadway intersection 178, in which a traffic detection device 179 with a local detection processor (not shown) monitors 180 an approach 182. Contact closure data 184, along with traffic signal state data 186, is sent via network connection 188 to a data collection device 190 at a central monitoring station 192. In this example, the data collection device 190 may or may not be connected to an enforcement camera 194.

Figure 8:
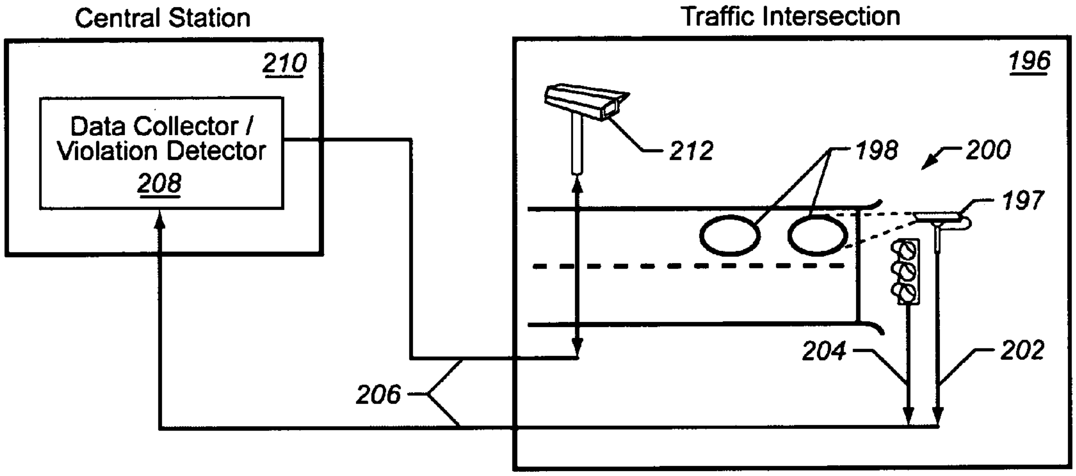
FIG. 8 depicts another alternate embodiment of the present disclosure similar to that depicted in FIG. 7.

FIG. 8 depicts yet another an example showing a typical roadway intersection 196, in which a traffic detection device 197 monitoring 198 an approach 200, sending a vehicle detection signal 202 along with additional information, such as speed and classification along with traffic signal information 204 over network connections 206 to a data collection device 208 at a central monitoring location 210. In this example, the data collection device 208 may or may not be connected to an enforcement camera 212.

Various embodiments allow the use of any vehicle detection device without departing from the spirit and scope of the invention, including, but not limited to, video detection cameras, inductive loops, magnetic microloops, or radar to be located as usual on or near the roadway.

At the central monitoring station if raw sensor information has been sent, vehicle detectors are connected to provide contact closure data or additional information (such as speed, classification, etc.). Furthermore, a data collection or automated enforcement detection device may be connected to data feeds from the vehicle detectors at the central monitoring station in addition to a networked signal providing traffic signal state.

As an alternative, or in addition, to having a central station capable of receiving raw sensor information, many embodiments include a central station capable of receiving contact closure information from vehicle detection processors. In the latter case, contact closures can be sent via network connection to a data collection and/or automated enforcement detection device along with traffic signal state. The system can also receive time-stamped position, speed, classification, etc. information from intelligent sensors. This configuration resembles the contact-closure scenario in other respects.

The automated enforcement violation detection device may also be connected via a network connection to cameras at the remotely monitored intersection. If a violation is detected, these cameras can be triggered via the network connection in real-time to record multiple images of the violating vehicle. The resulting image data can then be transferred across the network connection to the data collection device.

If it is desired to cease monitoring an approach, intersection, or roadway and initiate monitoring a different approach, intersection, or roadway, the data collection device can simply be disconnected from the current network connection and re-connected to a network connection at the new location.

Alternately, if appropriated data collection devices exist at the new location, data collection and/or automated enforcement can be switched from one remote location to another remote location by a simple network connection switch at the central monitoring station.

Figure 9A:
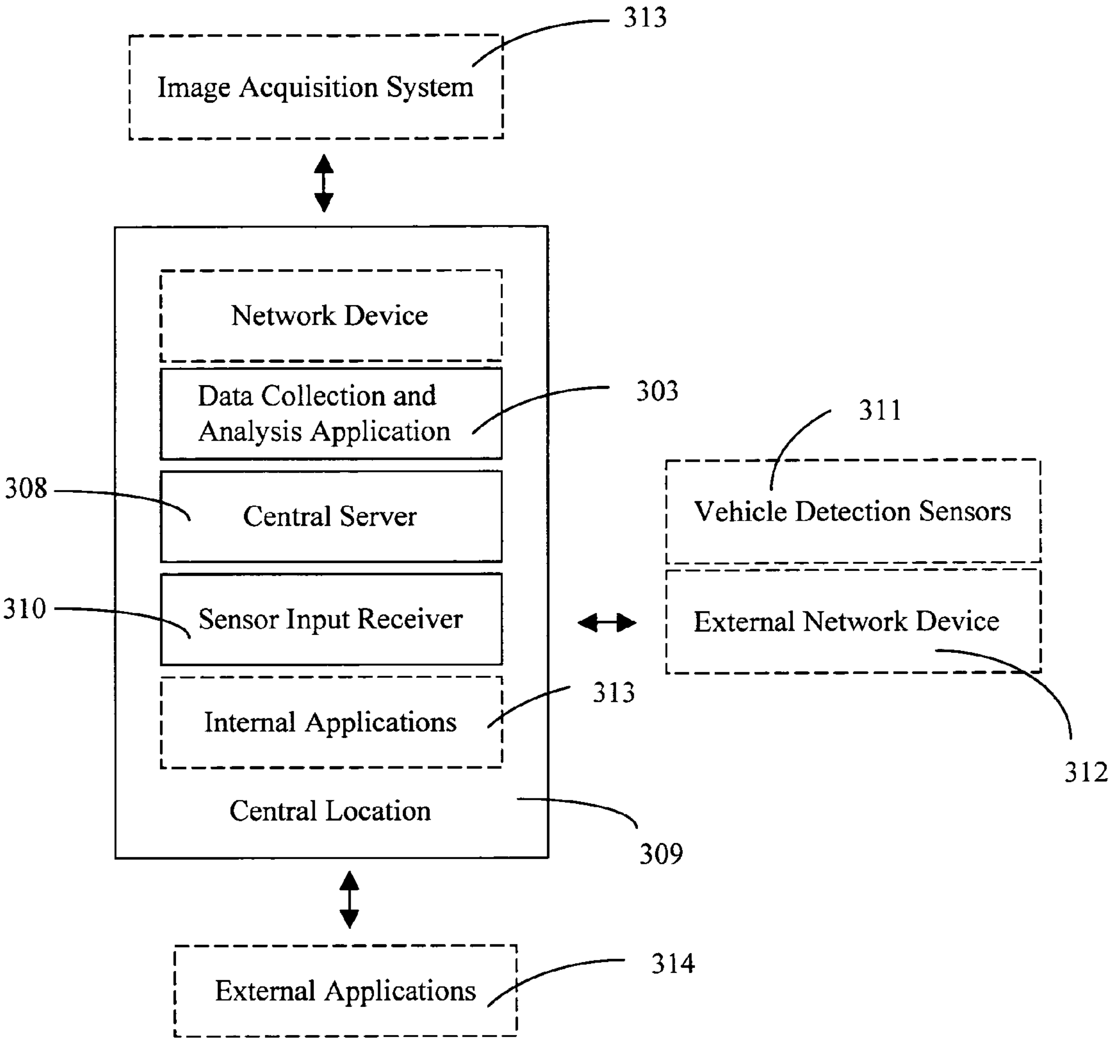
FIGS. 9A and 9B, taken together, depict schematic block diagrams of a system for analyzing vehicle data, according to an embodiment of the invention.
Figure 9B:
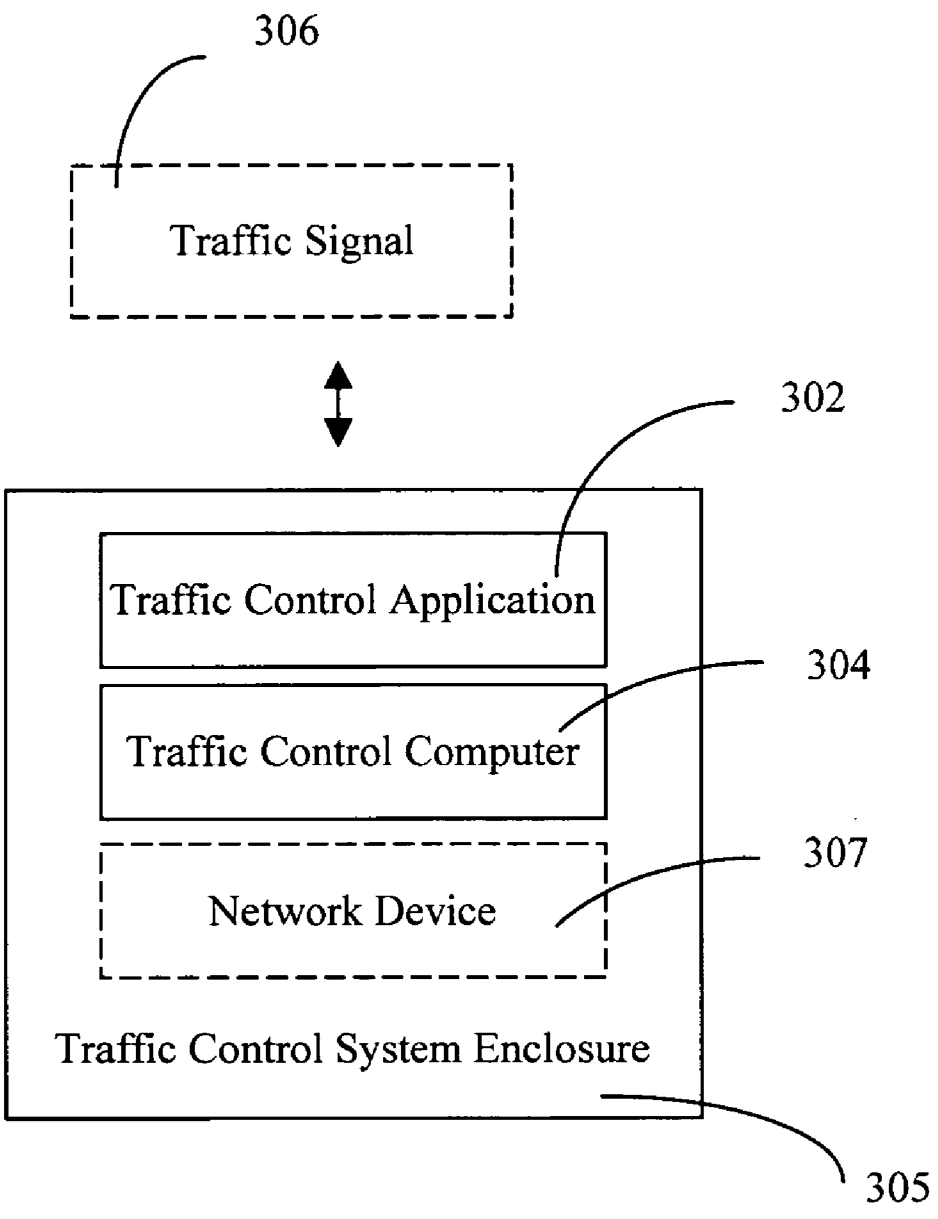

FIGS. 9A and 9B, taken together, depict schematic block diagrams of a system for analyzing vehicle data according to an embodiment of the invention. The system 301 includes a traffic control application 302 and a data collection and analysis application 303. The traffic control application 302 operates on a traffic control computer 304 and resides in a traffic control system enclosure 305. The traffic control computer 304 is connected to a traffic signal 306 and includes a network device 307. The network device 307 allows connection to the central server 308 and provides signal state change data from the traffic signal 306 and the traffic control computer 304. The data collection and analysis application 303 operates on a central server 308 which resides at a remote central location 309. The central server 308 includes a sensor input receiver 310 which receives inputs from the vehicle detection sensors 311. The vehicle detection sensors share the network device 307 with the traffic control computer 304 but in other embodiments use an external network device 312. The central server 308 also includes a network device 307 in order to allow the data collection and analysis application to connect to an image acquisition system 313 or the traffic control application 302. The central server supports internal applications 314 or external applications 315.

The vehicle detection sensors 311 detect a vehicle or vehicles. The sensors 311 communicate data associated with the vehicles through the external network device 312 to the sensor input receiver 310 to the central server 308. The traffic control computer 304 and/or the traffic control application 302 communicates data from traffic signal 306 through the network device 307 to the central server 308. The central server 309 communicates data from the traffic control computer 304, the traffic control application 302, and the sensor input receiver 310 to the data collection and analysis application 303. The data collection and analysis application 303 analyzes the data received to predict the vehicle's path through the intersection, including but not limited to determining whether a traffic violation or other safety hazard has occurred or is likely to occur. Further, the data collection and analysis application 303 schedules a time for the acquisition of one or more images associated with an event relating to the vehicle's travel path and communicates that schedule through a network device 307 to an image acquisition system 313. Such images are transmitted to the central server 308 through the external network device 312. Furthermore, the data collection and analysis application 303 combines data received from the image acquisition system 313, the vehicle detection sensors 311, and the traffic signal 306 in the process of creating a record of the vehicle's travel up to and through the intersection, as well as storing the record on the central server 308 before making it available to internal applications 314 or external applications 315.

Figure 10:
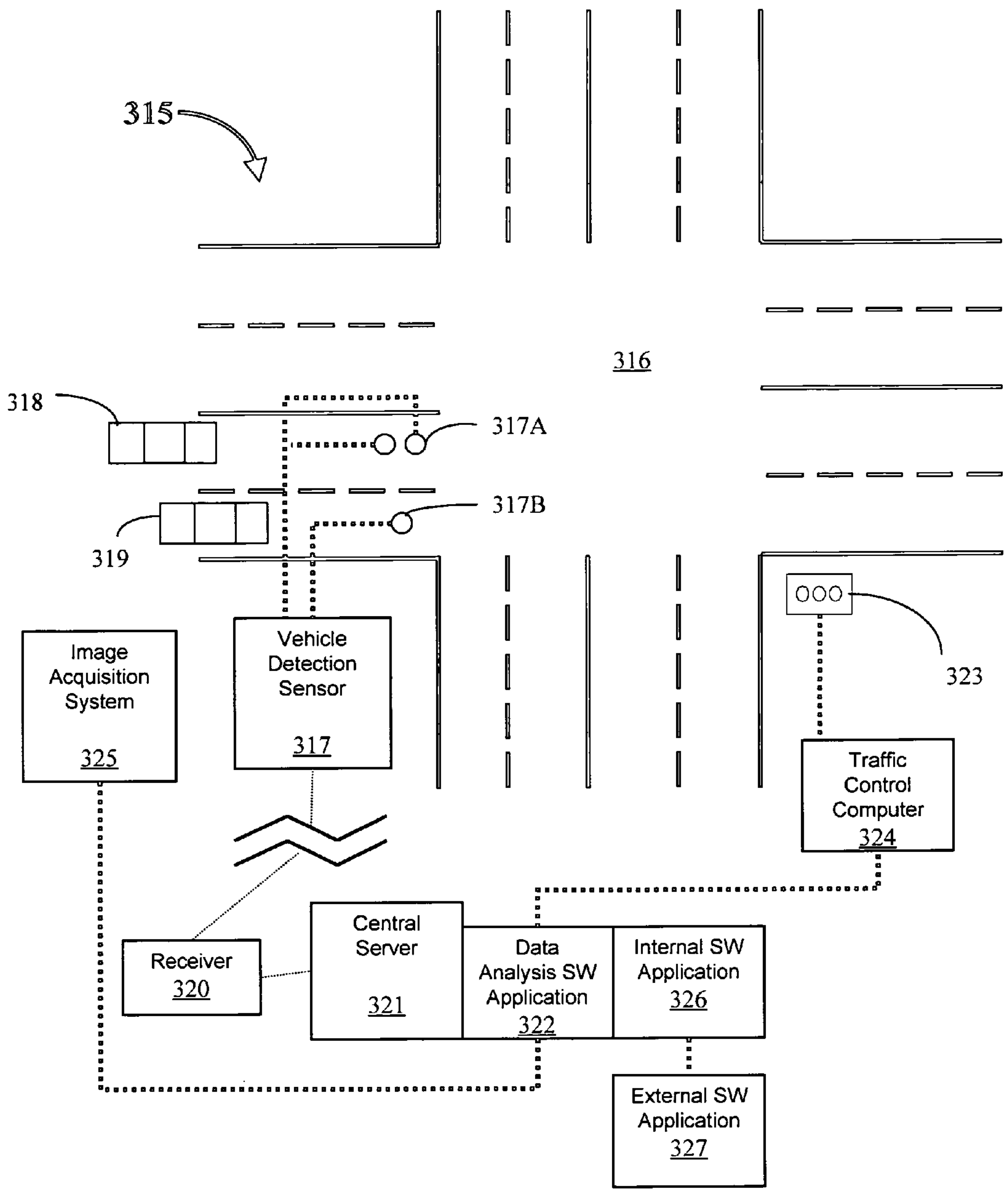
FIGS. 10-13 are schematic block diagrams of embodiments of systems according to FIGS. 9A and 9B, according to embodiments of the invention.

FIG. 10 is a schematic block diagram of an embodiment of the system according to FIGS. 9A and 9B. In this embodiment 315 an intersection 316 is shown. On at least one approach to the intersection 316, vehicle detection sensors 317 define detection zones 317A and 317B. Depending upon the particular type and configuration of vehicle detection sensors in use, the sensors 317 could be placed in, on, under, and/or above the road. The sensors 317 detect one or more vehicles 318 and 319 approaching the intersection 316. The sensors 317 signal the sensor input receiver 320 with the sensor output associated with the vehicles 318 and 319. The sensor input receiver 320 converts the sensor output to contact closure data and sends the contact closure data to the central server 321. Furthermore, the central server 321 provides the data associated with vehicles 318 and 319 to the data collection and analysis application 322. The data collection and analysis application 322 receives signal state data either directly from the traffic signal 323 or from the traffic control computer 324. The data collection and analysis application 322 analyzes data associated with the vehicles 318 and 319 in conjunction with the signal state data and predicts or detects the vehicle's path of travel up to and through the intersection. The data collection and analysis application 322 timestamps and records each of the detection events, signal states, and signal change events associated with the vehicle's travel up to and through the intersection.

In another exemplary embodiment, the sensor input receiver 320 is physically located with the traffic control computer 324. In this embodiment, the sensors 317 signal the sensor input receiver with the sensor output associated with the vehicles 318 and 319. The sensor input receiver converts the sensor output to contact closure data to the traffic control computer 324. The traffic control computer 324 then sends the contact closure data and delivers it and traffic signal 323 status data related to the vehicles 318 and 319 to the central server 321. Furthermore, the central server 321 provides the data associated with vehicles 318 and 319 to the data collection and analysis application 322.

In another exemplary embodiment, the data collection and analysis application 322 analyzes the data relating to a vehicle's approach to the intersection to determine if a traffic violation or other safety hazard has occurred or is likely to occur. If the analysis indicates that such a violation or hazard is likely to occur, the data can be characterized as falling within a "violation" or "hazard" classification. Furthermore, the data collection and analysis application 322 captures, or schedules a time for the acquisition of, one or more images associated with the traffic violation or safety hazard by communicating with the image acquisition system 325. Images created with the image acquisition system 325 are transmitted to the central server 321 where they are combined with the vehicle detection and signal state data associated with the violation or hazard and the made available for use by internal 326 or external 327 applications.

For example, vehicle 318 approaches the intersection 316. The vehicle 318 passes through detection zone 317A and causes a detection event or events to be sent from the vehicle detection sensor 317 to the sensor input receiver 320 and then to the central server 321. Furthermore, the data collection and analysis application 322 receives the detection data associated with vehicle 318 from the central server 321. The data collection and analysis application 322 also receives data from the traffic control computer 324 regarding the status of the traffic signal 323 which may be red. The data collection and analysis application 322 then associates the traffic signal 323 status with the detection data and analysis relating to vehicle 318. The data collection and analysis application 322 determines that a violation has occurred or is likely to occur. For example, the data collection and analysis application 322 measures or determine the location, speed, and acceleration of vehicle 318, relates this data to the status of traffic signal 323, and ascertains the likelihood of vehicle 318 running a red light. Furthermore, the data collection and analysis application 322 schedules images to be acquired of the red light violation using the image acquisition system 325. Images of the red light violation are then be transmitted to the central server 321 and combined with vehicle and signal state data associated with the violation on the central server 321.

In another example, vehicle 319 approaches the intersection 316. The vehicle 319 passes through detection zone 317B, and causes a detection event or events to be sent through the vehicle detection sensor 317 to the sensor input receiver 320, and then to the central server 321. Furthermore, the data collection and analysis application 322 receives the detection data associated with vehicle 319 through the central server 321. The data collection and analysis application 322 also receives data from the traffic control computer 324 regarding the status of traffic signal 323 and associates that status with the detection data associated with vehicle 319. Base on its analysis, the data collection and analysis application 322 records and stores the data on the central server 321, transfers the data for use by an external application 327, or schedules images to be recorded using the image acquisition system 325.

In another example, vehicle 318 approaches the intersection 316. The vehicle 318 passes through detection zone 317A, and causes a detection event or events to be sent through the vehicle detection sensor 317 to the sensor input receiver 320, and then to the central server 321. The data collection and analysis application 322 receives the detection data associated with vehicle 318, calculate the speed of vehicle 318, and determine that a speeding violation has occurred. Furthermore, the data collection and analysis application 322 schedules images to be acquired of the speeding violation using the image acquisition system 325. Images and data associated with the speeding violation are then stored on the central server 321 and made available for use by internal applications 326 and/or external applications 327.

Figure 11:
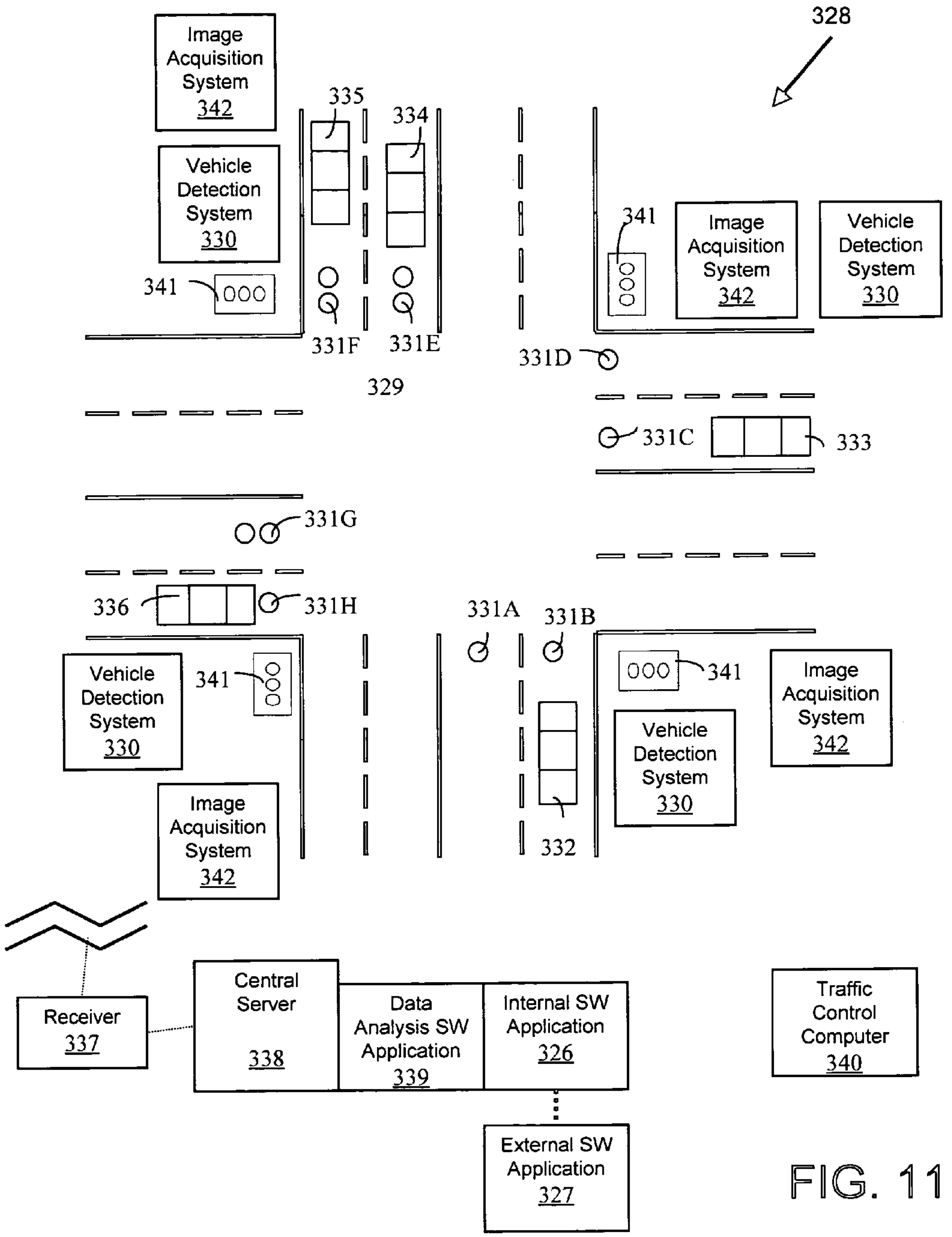

FIG. 11 is a schematic block diagram of an exemplary embodiment of the system according to FIGS. 9A and 9B. In this exemplary embodiment 328, an intersection is shown 329. On multiple approaches to the intersection 329, one or more vehicle sensors 330 define detection zones 331A, 331B, 331C, 331D, 331E, 331F, 331G, and 331H. The vehicle detection devices are placed, as appropriate, in, on, under, or above the road. The sensors detect one or more vehicles 332, 333, 334, 335, and 336 approaching the intersection. The sensors 330 signal the sensor input receivers 337 with the sensor outputs associated with vehicles 332, 333, 334, 335, and 336. The sensor input receivers 337 convert the sensor outputs associated with vehicles 332, 333, 334, 335, and 336 to contact closure data and deliver the data to the central server 338. Furthermore, the central server 338 delivers the data associated with the vehicles 332, 333, 334, 335, and 336 to the data collection and analysis application 339. In this example, two vehicles 332 and 333 approach the intersection. The vehicle 332 passes through detection zone 331B and vehicle 333 passes through detection zone 331C resulting in detection events being recorded by the sensors 330. The detection events are transmitted to the sensor input receivers 337 and then to the central server 338. The central server 338 then transfers the data to the data collection and analysis application 339. Using the detection event data, the data collection and analysis application 339 determines location, speed, and acceleration of both vehicles 332 and 333. The traffic control computer 340 delivers traffic signal 341 state data to the central server 338 where it is made available to the data collection and analysis application 339. The data collection and analysis application 339 also analyzes signal state data based on the state of traffic signals 341. Furthermore, the data collection and analysis application 339 predicts a path of travel for both vehicles 332 and 333, based on the analysis of the detection event data and signal state data, to determine if there is a potential for a collision or near collision of the two vehicles. In the event of detecting a collision or near collision, the data collection and analysis application 339 schedules the acquisition of images of the event using an image acquisition system 342.

In another example, two vehicles 334 and 336 approach the intersection. Vehicle 334 is an emergency vehicle, and vehicle 336 is a privately owned vehicle. Vehicle 334 travels through the detection zone 331E and vehicle 336 travels through the detection zone 331H, with sensors 330 recording detection events. The detection events are then transferred to the sensor input receivers 337 and then to the central server 338. The central server 338 then transfers the vehicle detection data to the data collection and analysis application 339. Furthermore, the emergency vehicle 334 communicates information to the traffic control computer 340 about its status as an emergency vehicle. The traffic control computer 340 then communicates vehicle 334's status to the central server 338 and then to the data collection and analysis application 339. The data collection and analysis application 339 analyzes traffic signal 341 status in conjunction with the detection events related to vehicles 334 and 336. Further, the data collection and analysis application 339 predicts or detect a red light violation by vehicle 336, and notifies the traffic control computer 340 of the violation or impending violation. The traffic control computer 340 then communicates the impending or occurring red light violation of vehicle 336 to the emergency vehicle 334, thereby reducing the likelihood of a collision.

In another example, two vehicles 335 and 336 approach the intersection 329. Vehicle 335 travels through the detection zone 331F and vehicle 336 travels through the detection zone 331H. Sensors 330 record the detection events. The detection events are transferred to the sensor input receivers 337 and then to the central server 338. The central server 338 then transfers the vehicle detection data to the data collection and analysis application 339. The traffic control computer 340 communicates traffic signal 341 status to the central server 338 and then to the data collection and analysis application 339. The data collection and analysis application 339 relates traffic signal 341 status to the detection events related to vehicles 335 and 336 and further predicts travel paths of the two vehicles. The signal phasing may be such that both vehicles 335 and 336 are approaching the intersection 329 with the traffic signal 341 displaying a red light. The next planned phase of the traffic signal 341 may be to display a green light to vehicle 335 and to continue to display a red light to vehicle 336. The data collection and analysis application 339, after analysis, can predict or detect whether a red light violation is occurring or is about to occur based on the location, travel path, speed, or acceleration of vehicle 336. The data collection and analysis application 339 also communicates the likelihood or actuality of this red light violation to the traffic control computer 340. The traffic control computer 340 then preempts the planned change of status of the traffic signal 341 that is facing vehicle 335 and holds the traffic signal 341 in the red display condition until vehicle 336 is clear of the intersection.

Figure 12:
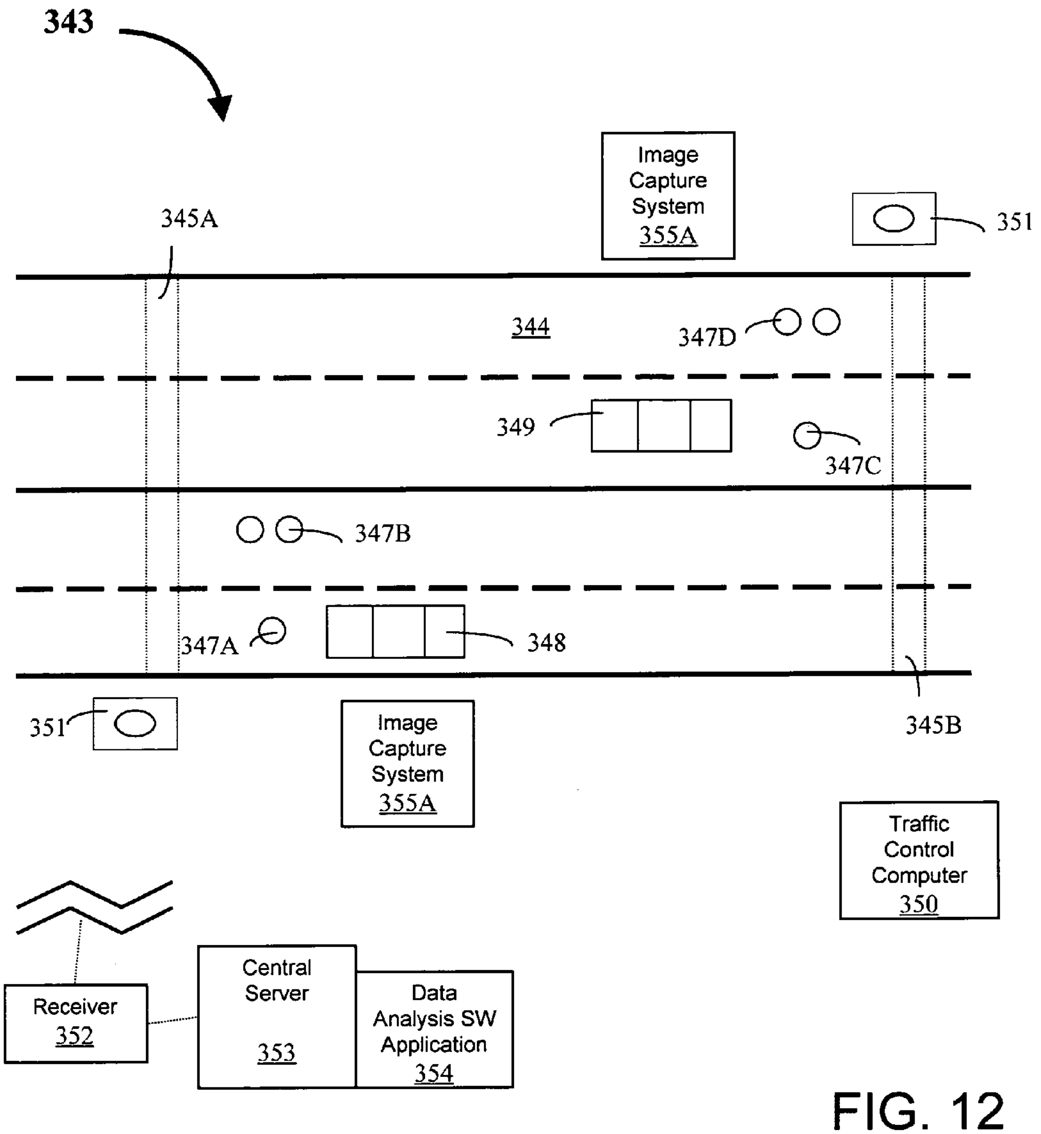

FIG. 12 is a schematic block diagram of an exemplary embodiment of the system according to FIGS. 9A and 9B. In this exemplary embodiment 343, a defined roadway 344 is shown. Markers, signs, or striping areas 345A and 345B define the boundaries of the area 344. The zone may be a school zone, construction zone, neighborhood or other roadway zone defined by boundaries. A vehicle detection sensor 346 defines detection zones 347A, 347B, 347C, and 347D. The vehicle detection sensor 346 detects vehicles 348 and 349 as they pass through detection zones 347A, 347B, 347C, and 347D. Further, the vehicle detection sensor 346 communicates detection events to the traffic zone controller 350. The traffic zone controller 350 communicates with indicator lamps 351 to notify passing vehicles 348 and 349 that they are traveling through a defined roadway area 344, and that, as a result, special conditions such as speed limits may apply. In this example vehicle 348 travels through detection zone 347A and vehicle 349 travels through detection zone 347C. Vehicle detection sensor 346 detects vehicles 348 and 349 as they pass through zones 347A and 347C respectively. Vehicle detection sensor 346 communicates these detection events to the sensor input receivers 352. The sensor input receivers 352 communicates the detection events to the central server 353 and then to the data collection and analysis application 354. The traffic zone controller 350 also communicates the status of the indicator lamps 351 to the data collection and analysis application 354. Furthermore, the data collection and analysis application 354 calculates the speed of vehicles 348 and 349 and correlate this data with the status of the indicator lamps 351. The data collection and analysis application 354 then determines that vehicles 348 and 349 are in violation of the speed limit defined by the indicator lamps 351 being illuminated for the roadway area 344. Further, the data collection and analysis application 354 schedules images to be captured of the violations using image capture systems 355A and 355B. In this example, the data collection and analysis application 354 schedules images specifically for vehicle 348 and uses image capture system 355A, and schedules image capture system 355B to record images of vehicle 349.

Figure 13:
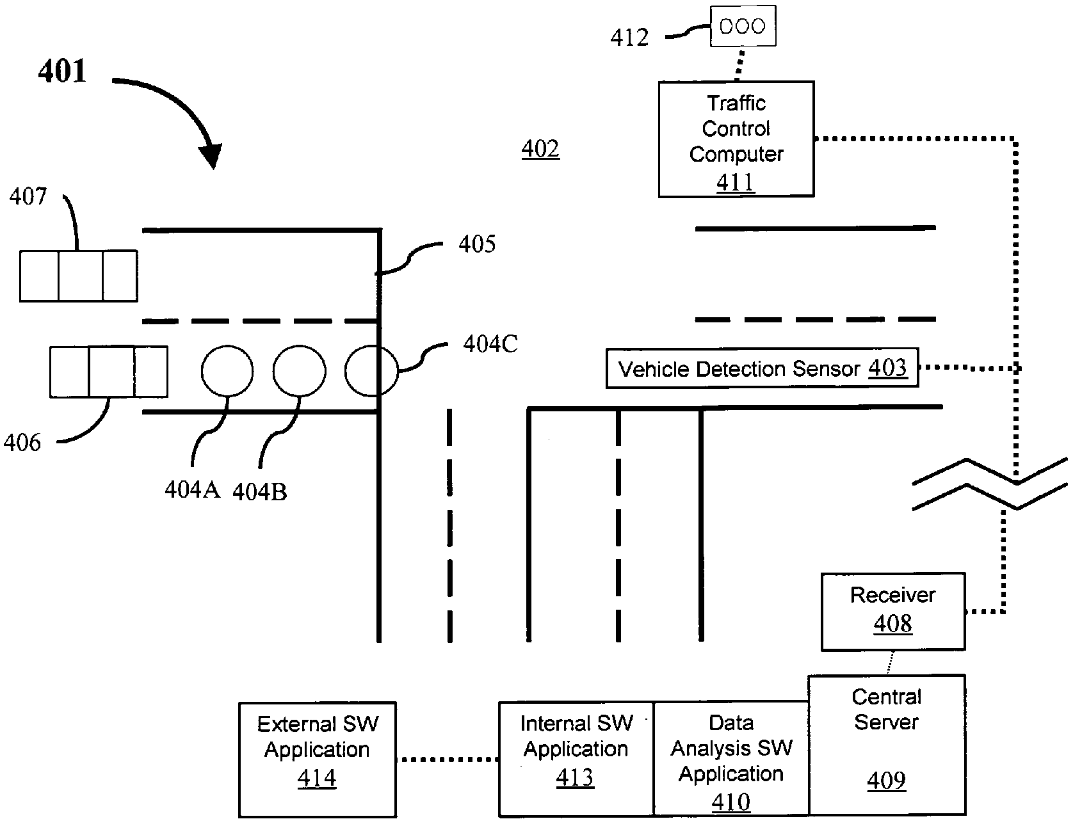

FIG. 13 is a schematic block diagram of an exemplary embodiment of the system according to FIG. 1. In this exemplary embodiment 401 an intersection 402 is shown. On at least one approach to the intersection 402, video based vehicle detection sensors 403 define detection zones 404A, 404B and 404C. Detection zones 404A and 404B are in the approach lane prior to the entrance to the intersection and detection zone 404C may cross the stop bar 405 at the entrance to the intersection. The vehicle detection sensors 403 detect one or more vehicles 406 and 407 approaching the intersection. The sensors 403 signal the sensor input receivers 408 with the data associated with vehicles 406 and 407. The sensor input receivers 408 convert the sensor data to contact closure data and deliver it to the central server 409, which then delivers it to the data collection and analysis application 410. The data collection and analysis application 410 receives signal state data from the traffic control computer 411 or directly from the traffic signal 412. The data collection and analysis application 410 analyzes data associated with the vehicles 406 and 407 in conjunction with the signal state data and predicts or detects the vehicle's path of travel up to and through the intersection. The data collection and analysis application 410 timestamps and records each of the detection events, signal states, and signal change events associated with the vehicle's travel up to and through the intersection.

In another exemplary embodiment, the data collection and analysis application 410 analyzes the data relating to a vehicle's approach to the intersection 402 to determine if a traffic violation or other safety hazard has occurred or is likely to occur. The central server 409 may also be buffering and temporarily storing the video feed from the detection sensors 403. Furthermore, the data collection and analysis application 410 determines the time in which a traffic violation was predicted and/or occurred and directs the central server to store sensor 403 images from the time immediately before through the time immediately after the violation. Sensor 403 images are combined with the vehicle detection data and stored on the central server 409 for use by internal 413 or external 414 applications.

For example, vehicle 406 approaches the intersection 402. The vehicle 406 passes through detection zones 404A and 404B and causes detection events to be sent through the vehicle detection sensor 403 to the sensor input receivers 408. The sensor input receivers 408 convert the sensor data to contact closure data and deliver it to the central server 409, which then delivers it to the data collection and analysis application 410. The data collection and analysis application 410 also receives data from the traffic control computer 411 regarding the status of the traffic signal 412 which may be red. The data collection and analysis application 410 then associates the traffic signal 412 status with the detection data and analysis relating to vehicle 406. The data collection and analysis application 410 determines that a violation has occurred or is likely to occur. For example, the data collection and analysis application 410 measures or determines the location, speed, and magnitude of acceleration of vehicle 406, relate this data to the status of traffic signal 412, and ascertains the likelihood of vehicle 406 running a red light. Furthermore, vehicle 405 passes through detection zone 404C and causes detection events to be sent through the vehicle detection sensor 403 to the sensor input receivers 408 and then to application server 409 and the data collection and analysis application 410. In the event of a red light running confirmation, the data collection and analysis application 410 directs the central server 409 to store the video images beginning with the initial detection event from zone 404A through the time vehicle 406 has traveled through the intersection. The data collection and analysis application 410 then combines the images, detection event, and signal state data relating to the violation and stores them on the central server 409 for use by internal 413 or external 414 applications.

Figure 14:
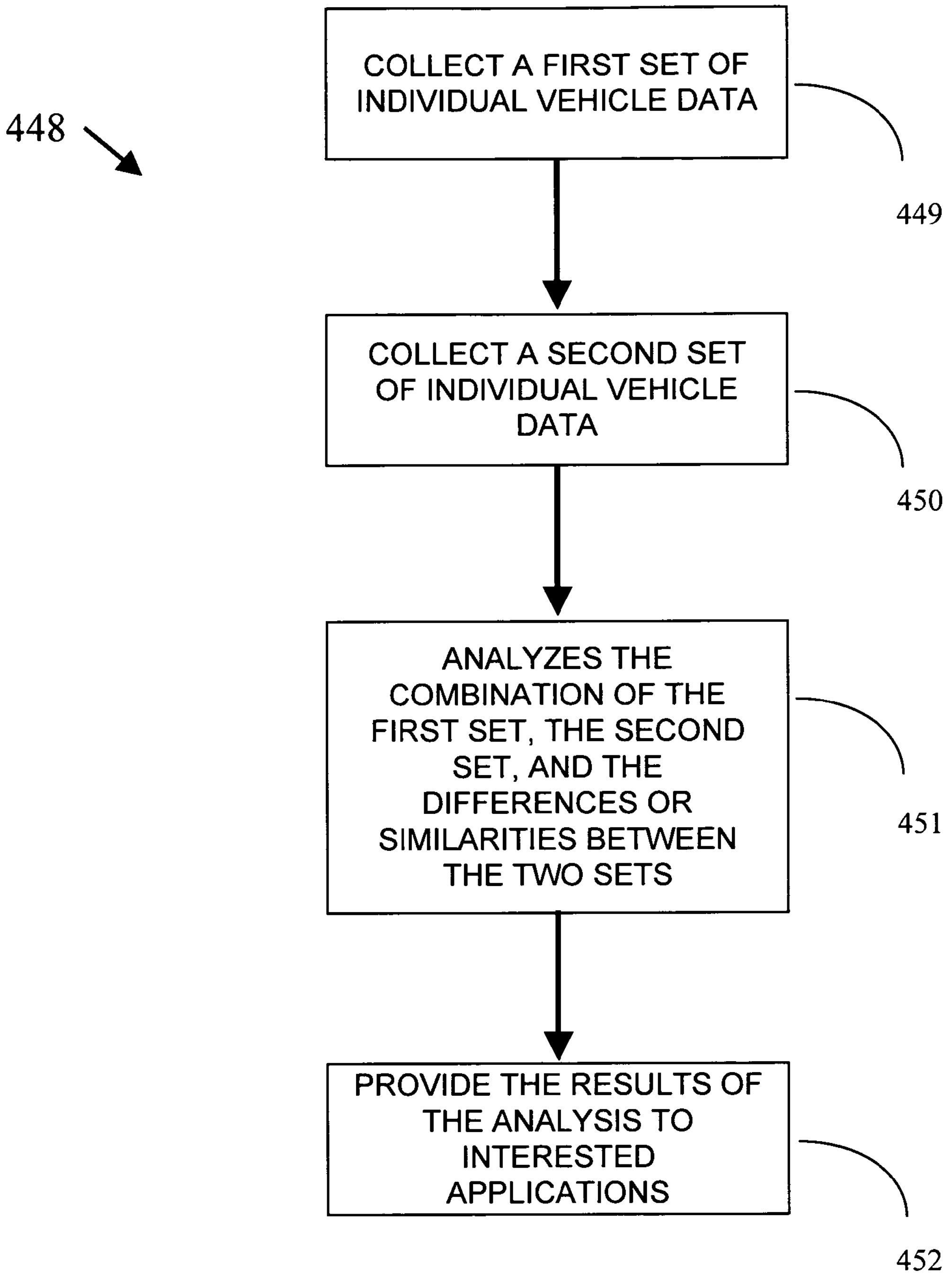
FIGS. 14-16 are block flow diagrams of exemplary embodiments of methods for use in systems as seen in FIGS. 9A and 9B, according to embodiments of the invention.

FIG. 14 is a block flow diagram of an exemplary embodiment of a method for use in a system as seen in FIGS. 9A and 9B. In this exemplary method 448, the data collection and analysis system collects a first set of individual vehicle data 449 and a second set of individual vehicle data 450. Furthermore, the data collection and analysis system analyzes the combination of the first set, the second set, and the differences or similarities between the two sets 451. Finally, the data collection and analysis system provides the result of the analysis 452 to interested local or external applications. For example, the data collection and analysis system collects data over the course of a month to determine average traffic volume by hour of the day. The data collection and analysis system further collects the same set of data in a different month. Finally, the data collection and analysis system compares the two sets of data to either define a historical model to be used for future reference, or to determine differences in traffic volume on a monthly basis.

In another example, the data collection and analysis system collects a set of individual vehicle data 449, reviews a model (historical or preferred) set of data 450, and analyzes the similarities and differences in the data sets 451. The result of the analysis 452 is provided to interested external or internal applications. For example, the data collection and analysis system collects data on vehicle volumes for different times of day. It may compare actual volumes to historical volumes and determine that volume for the current hour is 10% of the historical average. The data collection and analysis system then generates a notice of this condition and deliver it to interested local or external applications.

Figure 15:
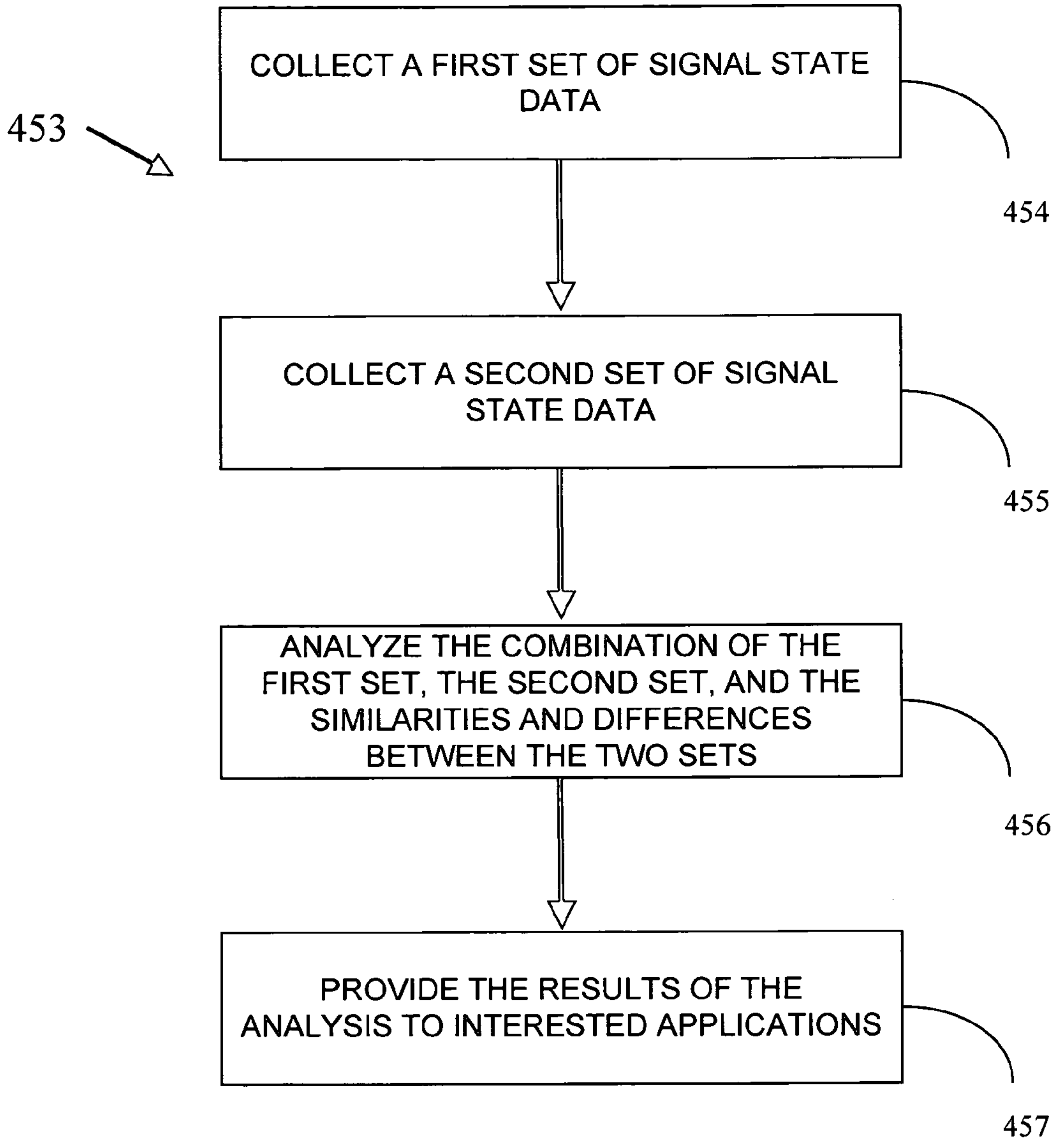

FIG. 15 is a block flow diagram of an exemplary embodiment of a method for use in a system as seen in FIGS. 9A and 9B. In this exemplary method 453, the data collection and analysis system collects a first set of signal state data 454 and a second set of signal state data 455. Furthermore, the data collection and analysis system analyzes the combination of the first set, the second set, and the differences or similarities between the two sets 456. Finally, the data collection and analysis system provides the result of the analysis 457 to interested local or external applications. For example, the data collection and analysis system collects data over the course of a month to determine average green, amber, and red timing. The data collection and analysis system further collects the same set of data in a different month. Finally, the data collection and analysis system compares the two sets of data to determine if the signal timing has changed in an allowable range. If the change in signal timing is outside of the allowable range, the data collection and analysis application sends a notice to an interested local or external application.

In another example, the data collection and analysis system collects a set of signal state data 454 and review a model (preferred or historical) set of signal state data 455. Furthermore, the data collection and analysis system analyzes the combination of the first set, the second set, and the differences or similarities between the two sets 456. Finally, the data collection and analysis system provides the result of the analysis 457 to interested local or external applications. For example, the data collection and analysis system collects signal state data 454 on green, amber, and red signal display times for each phase change during the course of the day. The data collection and analysis system reviews the green, amber, and red signal display times as provided by the model data 455. Further, the data collection and analysis application compares the model and actual data 456, determines that the amber signal display times 454 are different from the model 455, and records the differences over time. Additionally, the data collection and analysis application determines that the difference between the actual amber signal display time 454 and the model display time 455 is increasing, and predicts that the signal timing will soon be out of specification as determined by the signal timing model. Finally, the data collection and analysis application communicates the out of specification prediction results 457 to interested local or external applications.

Figure 16:
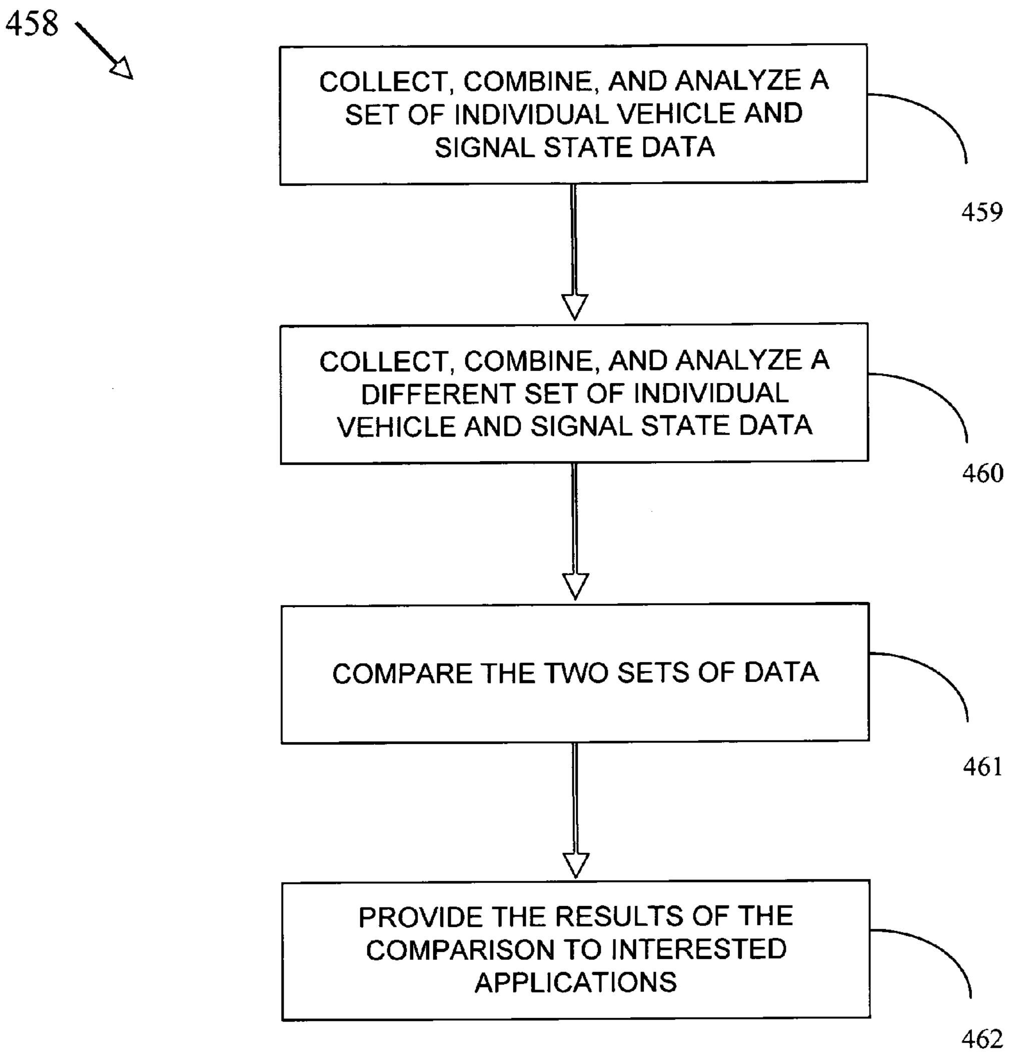

FIG. 16 is a block diagram of an exemplary embodiment of a method for use in a system as seen in FIGS. 9A and 9B. In this exemplary method 458, the data collection and analysis application collects, combines, and analyzes a set of individual vehicle and signal state data 459. The data collection and analysis application also collects, combines, and analyzes a different set of individual vehicle and signal state data 460. Furthermore, the data collection and analysis application compares the two sets of data 461, and provides the results 462 to interested internal or external applications. For example, the data collection and analysis application could collect, combine, and analyze a set of individual vehicle and signal state data to determine the number of red light violations occurring in a particular time period 459. The data collection and analysis application would subsequently collect the same type of data over a different time period 460. The data collection and analysis application would then compare the data sets 461, and determine that the number of red light violations had increased over the time period, and report the results 462 to interested internal or external applications.

In another example, the data collection and analysis application first collects, combines, and analyzes a set of individual vehicle and signal state data 459. The data collection and analysis application then reviews a second model (preferred or historical) set of data 460 and compares the two sets of data 461, providing results 462 to interested internal or external applications. For example, the data collection and analysis application could collect, combine, and analyze a set of individual vehicle and signal state data to determine the number of red light violations occurring in a particular time period 459. The data collection and analysis application would then review the number of red light running violations in a like time period from the model data 460 and compare the data sets 461, determining whether the number of red light violations from the actual data 459 exceeds the number of violations expected by the model 460, and reporting the results 462 in the form of a notice, alarm, or other communication to interested internal or external applications.

All references, including publications, patent applications, and patents, cited herein are hereby incorporated by reference to the same extent as if each reference were individually and specifically indicated to be incorporated by reference and were set forth in its entirety herein.

The term "individual vehicle data," as used hereunder means data collected by vehicle detection devices and the traffic signal state that may be associated with the individual vehicle (e.g., travel through the intersection, travel along the roadway, etc.).

The term "individual raw vehicle data," as used hereunder, means individual vehicle data that has not been processed by a traffic detection device.

The term "state change events," means changes in a traffic signal from one state to another (e.g., red-to-yellow, red-to-flashing-red, etc.). The term can include the time one or more changes occurred.

The use of the terms "a" and "an" and "the" and similar referents in the context of describing embodiments of the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

The term "intersection," as used hereunder, includes any defined traffic area, and therefore includes school zones, an approach to another defined traffic area, and the interior of an intersection, among others.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. For example, information can be transmitted from an intersection via wireless connectivity, wire line connectivity, among other communications means. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method comprising:

via a first processor at a central station, scheduling capturing of at least one image of an individual vehicle at a first remote traffic intersection, said scheduling responsive to automatic processing of:

information related to said individual vehicle, said individual vehicle associated with said first remote traffic intersection, and information related to a first traffic signal associated with said first remote traffic intersection, said first remote traffic intersection one of a plurality of remote traffic intersections from each of which information related to corresponding traffic signals is received at said central station.

2. The method of claim 1, further comprising:

at said central station, automatically processing said information related to said individual vehicle.

3. The method of claim 1, further comprising:

at said central station, automatically processing said information related to said first traffic signal.

4. The method of claim 1, further comprising:

at said central station, receiving said information related to said individual vehicle.

5. The method of claim 1, further comprising:

at said central station, receiving said information related to said first traffic signal.

6. The method of claim 1, further comprising:

at said central station, requesting a captured image of said individual vehicle.

7. The method of claim 1, further comprising:

at said central station, receiving a captured image of said individual vehicle at said first remote traffic intersection responsive said scheduling.

8. The method of claim 1, further comprising:

at said central station, receiving individual vehicle contact closure data related to said individual vehicle.

9. The method of claim 1, further comprising:

at said central station, receiving individual vehicle speed data related to said individual vehicle.

10. The method of claim 1, further comprising:

at said central station, receiving individual vehicle classification data related to said individual vehicle.

11. The method of claim 1, further comprising:

at said central station, receiving individual vehicle violation detection data related to said individual vehicle.

12. The method of claim 1, further comprising:

at said central station, receiving individual vehicle time-stamped position data related to said individual vehicle.

13. The method of claim 1, wherein:

said information related to said first traffic signal comprises one or more state change events.

14. The method of claim 1, further comprising:

from said central station, transmitting, to equipment at at least one of the intersections, a control signal based on the individual vehicle information.

15. A computer-readable medium storing computer-implementable instructions for activities comprising:

via a first processor at a central station, scheduling capturing of at least one image of an individual vehicle at a first remote traffic intersection, said scheduling responsive to automatic processing of:

information related to said individual vehicle, said individual vehicle associated with said first remote traffic intersection, and information related to a first traffic signal associated with said first remote traffic intersection, said first remote traffic intersection one of a plurality of remote traffic intersections from each of which information related to corresponding traffic signals is received at said central station.

16. A system comprising:

a processor at a central station, said processor adapted for scheduling capturing of at least one image of an individual vehicle at a first remote traffic intersection, said scheduling responsive to automatic processing of:

information related to said individual vehicle, said individual vehicle associated with said first remote traffic intersection, and information related to a first traffic signal associated with said first remote traffic intersection, said first remote traffic intersection one of a plurality of remote traffic intersections from each of which information related to corresponding traffic signals is received at said central station.

17. The system of claim 16, further comprising:

a traffic detection device adapted for providing, to said central station processor, said information related to said individual vehicle.

18. The system of claim 16, further comprising:

a traffic detection device adapted for providing, to said central station processor, said information related to said first traffic signal.

19. The system of claim 16, further comprising:

a vehicle detection processor adapted for providing, to said central station processor, individual vehicle contact closure information.

20. The system of claim 16, further comprising:

an image capture device adapted for providing, to said central station processor, said at least one image of said individual vehicle.

21. The system of claim 16, further comprising:

an enforcement device adapted for providing, to said central station processor, said at least one image of said individual vehicle.

* * * * *